(12) United States Patent
Lee et al.

(10) Patent No.: US 8,311,670 B2
(45) Date of Patent: Nov. 13, 2012

(54) GENETIC ROBOT PLATFORM AND GENETIC ROBOT BEHAVIOR EXPRESSION METHOD

(75) Inventors: Kang-Hee Lee, Seoul (KR); Kwang-Choon Kim, Suwon-si (KR)

(73) Assignee: Samsung Electronics Co., LTD (KR)

( * ) Notice: Subject to any disclaimer, the term of this patent is extended or adjusted under 35 U.S.C. 154(b) by 1319 days.

(21) Appl. No.: 12/025,278

(22) Filed: Feb. 4, 2008

(65) Prior Publication Data
US 2008/0215182 A1 Sep. 4, 2008

(30) Foreign Application Priority Data
Feb. 8, 2007 (KR) .................. 10-2007-0013394

(51) Int. Cl.
G06F 19/00 (2011.01)
G05B 19/00 (2006.01)

(52) U.S. Cl. ............ 700/245; 701/1; 701/246; 701/248; 701/250; 701/257

(58) Field of Classification Search ........................ None
See application file for complete search history.

(56) References Cited

U.S. PATENT DOCUMENTS

| | | | | |
|---|---|---|---|---|
| 6,058,385 A * | 5/2000 | Koza et al. | ........................ | 706/13 |
| 6,321,140 B1 * | 11/2001 | Fujita et al. | .................... | 700/248 |
| 6,385,506 B1 * | 5/2002 | Hasegawa et al. | ............ | 700/245 |
| 6,445,978 B1 * | 9/2002 | Takamura et al. | ............ | 700/245 |
| 6,505,098 B1 * | 1/2003 | Sakamoto et al. | ............ | 700/245 |
| 6,650,965 B2 * | 11/2003 | Takagi et al. | ................. | 700/245 |
| 6,684,127 B2 * | 1/2004 | Fujita et al. | .................... | 700/245 |
| 6,697,711 B2 * | 2/2004 | Yokono et al. | ................ | 700/245 |
| 6,711,469 B2 * | 3/2004 | Sakamoto et al. | ............ | 700/245 |
| 7,099,742 B2 * | 8/2006 | Tajima et al. | ................. | 700/245 |
| 7,117,190 B2 * | 10/2006 | Sabe et al. | ....................... | 706/45 |
| 7,139,642 B2 * | 11/2006 | Kamoto et al. | ............... | 700/248 |
| 7,747,350 B2 * | 6/2010 | Matsuzaki et al. | ............ | 700/245 |
| 2002/0098879 A1 * | 7/2002 | Rheey | ............... | 463/1 |
| 2002/0138175 A1 * | 9/2002 | Fujita et al. | .................... | 700/245 |
| 2002/0156751 A1 * | 10/2002 | Takagi et al. | .................... | 706/12 |
| 2003/0045203 A1 * | 3/2003 | Sabe et al. | ..................... | 446/356 |
| 2004/0243281 A1 * | 12/2004 | Fujita et al. | .................... | 700/245 |
| 2005/0148390 A1 * | 7/2005 | Murase et al. | .................. | 463/40 |
| 2005/0246063 A1 * | 11/2005 | Oonaka | ......................... | 700/245 |

* cited by examiner

*Primary Examiner* — Ian Jen
(74) *Attorney, Agent, or Firm* — The Farrell Law Firm, P.C.

(57) ABSTRACT

A genetic robot platform and a genetic robot behavior expression method. When a controller of a robot platform driving a genetic robot, which has robot-behavior-expression-related information as gene information and of which an expression behavior is determined according to the gene information, recognizes a stimulation, the controller determines whether there is an instinctive behavior corresponding to the recognized stimulation. When there is an instinctive behavior corresponding to the recognized stimulation, the controller determines whether the recognized stimulation corresponds to the first generated stimulation or a repeatedly-generated stimulation, and determines an instinctive behavior to be expressed according to the recognized stimulation and the number of times of repeated stimulations. Then, the controller enables the robot to perform the instinctive behavior corresponding to the currently-recognized stimulation by expressing the determined instinctive behavior. Accordingly, there is an effect of providing a robot which is implemented to be more similar to real life.

17 Claims, 3 Drawing Sheets

GENETIC ROBOT PLATFORM AND GENETIC ROBOT BEHAVIOR EXPRESSION METHOD

This application claims priority under 35 U.S.C. §119(a) to an application filed with the Korean Intellectual Property Office on Feb. 8, 2007 and assigned Serial No. 2007-13394, the contents of which are incorporated herein by reference.

BACKGROUND OF THE INVENTION

1. Field of the Invention

The present invention generally relates to a genetic robot system, and more particularly to determining expression behaviors of a genetic robot.

2. Description of the Related Art

In general, a genetic robot represents an artificial creature, a software robot (sobot) or a normal robot which has its own unique genetic code. Also, a robot genetic code corresponds to one robot genome which is composed of a plurality of artificial chromosomes. A sobot generally represents software including an artificial creature, which sometimes functions as an independent software agent capable of interacting with a user, and which sometimes functions as an intelligence unit of a robot, enabling a hardware robot to cooperate with a sensor network, while moving through a network.

A plurality of the artificial chromosomes defined in the robot genome define a unique individuality or personality of a robot, which determines changes in internal states including motivation, homeostasis and emotional states of the robot through interacting with the external environment of the robot, and determines behaviors expressed according to the changes. The artificial creature, the motivation, homeostasis, emotion and behavior are defined as described in Table 1 below.

TABLE 1

| | |
|---|---|
| Artificial Creature | An artificially created object, which acts according to motivation of itself, has emotion, interacts with human, and can select one of behaviors. |
| Personality | A determiner of all or a part of behaviors, rather than a simply summarized technology of the behaviors. When a creature is regarded as a person, the personality may correspond to a character. This is a concept including motivation, homeostasis and emotion. That is, a personality engine represents an engine including motivation, homeostasis and emotion. This is a determiner to generate a variety of internal states and behavior expressions. |
| Motivation | A process of awakening a creature to an activity so as to maintain the activity and controlling the pattern of the activity. This causes the creature to select and perform an activity. For example, there are curiosity, familiarity, boredom, a desire to avoid, a desire to possess, a desire to rule, and so on. |
| Homeostasis | A function that enables a creature to stabilize its physiological state as an entity, even while the creature is ceaselessly receiving changes in the internal and external environments thereof. This causes the creature to select and perform an activity. For example, there are hunger, sleepiness, fatigue, and so on. |
| Emotion | A subjective vibration caused when a creature performs a behavior. For example, there are happiness, sadness, anger, and fear. |
| Behavior | A general term for all actions, for example, moving to or stopping at a specific point, which are performed by an entity. In case of animals, sleeping, eating, and running may be examples. The number of behaviors which an entity can select is limited. Each entity can perform only one behavior at one time. |

The artificial chromosomes include essential-element-related gene information, internal-state-related gene information and behavior-determination-related gene information. The essential-element-related gene information represents essential parameters which may exert a great influence on changes in internal states and on external behavior expressions. The internal-state-related gene information represents parameters which relate to external stimulations applied to the robot and exert influence on the internal states of the robot. The behavior-determination-related gene information represents parameters which determine external behaviors corresponding to currently-determined internal states.

The internal states include motivation, homeostasis and emotion states. That is, the internal states of a robot may be determined according to each internal-state item and internal-state parameters (i.e., internal-state-related gene information) according to each external stimulation, as shown in Table 2 below.

TABLE 2

| State | Internal | | | | | |
|---|---|---|---|---|---|---|
| External | Motivation | | Homeostasis | | Emotion | |
| Stimulation | Familiarity ... | Hostility | Hunger ... | Sleepiness | Happiness ... | Sadness |
| Touching | 80 ... | −40 | 0 ... | 0 | 40 ... | −20 |
| Strike | −30 ... | 50 | 0 ... | 0 | −30 ... | 30 |

TABLE 2-continued

| State | Internal | | | | | |
|---|---|---|---|---|---|---|
| External | Motivation | | Homeostasis | | Emotion | |
| Stimulation | Familiarity ... | Hostility | Hunger ... | Sleepiness | Happiness ... | Sadness |
| Surprising | 0 ... | 5 | 0 ... | 0 | 10 ... | 0 |
| ... | ... ... | ... | ... ... | ... | ... ... | ... |
| Pacifying | 40 ... | −40 | 0 ... | 0 | 50 ... | −50 |

Even in the case of the behavior-determination-related gene information, a table similar to Table 2 may be made, except that various expressible behaviors are included in place of external stimulations. That is, in a case of behavior-determination-related gene information, included are parameters for specific behaviors corresponding to each internal state, that is, parameters for expressing each behavior according to the parameter values of internal states, such as motivation, homeostasis, emotion, etc.

Also, essential parameters which exert a great influence on a change in each internal and on each external behavior expression may include whether there is volatility, an initial value, an average value, a convergence value, an attenuation value as time passes, and a specific value specially determined at a specific time. These parameters may be configured as separate essential-element-related gene information. Therefore, essential-element-related gene information includes whether there is volatility, an initial value, an average value, a convergence value, an attenuation value and a specific value, according to each internal state, that is, according to internal states of motivation, homeostasis and emotion. As described above, a robot genome includes essential-element-related gene information which is composed of parameters of essential elements for internal states, changes in each internal state, and external behavior expression, internal-state-related gene information which is composed of parameters for various external stimulations and the internal states corresponding to the external stimulations, and behavior-determination-related gene information which is composed of parameters for various expression behaviors and the internal states corresponding to the expression behaviors. That is, a robot genome may be expressed through a two-dimensional matrix, which includes internal states, and gene information for essential elements, external stimulations and expression behaviors corresponding to each internal state, as shown in Table 3 below.

Therefore, a conventional robot platform is constructed to determine a specific expression behavior according to a current internal state, that is, according to the states of the motivation, homeostasis, emotion, and so on, and to perform the specific expression behavior. For example, when a current internal state of a robot corresponds to a hungry state, the robot platform determines the robot to perform a behavior of teasing a user for something, and the robot behaves correspondingly. Accordingly, the robot may be implemented to perform such a behavior as in real life.

However, as described above, a conventional robot determines and performs a behavior according to a change in only the internal state of the robot. That is, a conventional robot is implemented without taking into consideration an instinctive behavior which a real life performs. For example, when a user strikes a creature, the creature will reflexively try to defend against or avoid the strike if the creature is a real life. However, a conventional robot, as described above, recognizes an external stimulation, updates an internal state of the robot according to a result of the recognition, and then performs a behavior corresponding to the recognition result. Accordingly, when recognizing a "strike" action by the user, a conventional robot may perform a corresponding behavior after decreasing a value of a familiarity parameter and increasing a value of a hostility parameter, but it is impossible for a conventional robot to perform such an instinctive behavior as a real life would.

SUMMARY OF THE INVENTION

Accordingly, the present invention solves the above-mentioned problems occurring in the prior art, and provides a genetic robot platform and a genetic robot behavior expression method, which can implement a robot capable of performing such an instinctive behavior as a real life would.

In addition, the present invention provides a genetic robot platform and a genetic robot behavior expression method, which enables a robot implemented in the robot platform to

TABLE 3

| | | Motivation | | Homeostasis | | Emotion | |
|---|---|---|---|---|---|---|---|
| | | Familiarity | Hostility | Hunger | Sleepiness | Happiness | Sadness |
| Essential Element | Volatility Initial value Attenuation value | Essential-Element-Related Gene (Motivation) | | Essential-Element-Related Gene (Homeostasis) | | Essential-Element-Related Gene (Emotion) | |
| External Stimulation | Touching Strike Pacifying | Internal-State-Related Gene (Motivation) | | Internal-State-Related Gene (Homeostasis) | | Internal-State-Related Gene (Emotion) | |
| Expression Behavior | Laughing Looking about Tumbling | Behavior-Determination-Related Gene (Motivation) | | Behavior-Determination-Related Gene (Homeostasis) | | Behavior-Determination-Related Gene (Emotion) | | analyze a recognized stimulation, to analyze whether the recognized stimulation corresponds to an action to cause an instinctive behavior, and to perform a corresponding instinctive behavior as it is needed.

In accordance with an aspect of the present invention, there is provided a robot platform for driving a genetic robot which determines an expression behavior according to genetic information, the robot platform including a recognition unit for recognizing a stimulation generated to the genetic robot; a memory unit for storing internal-state-related gene information including a parameter for at least one internal state of the genetic robot, and instinctive-behavior-related gene information including a parameter of at least one specific behavior defined as an instinctive behavior for at least one stimulation; a behavior determination unit for determining an expression behavior to be expressed by the genetic robot according to one of the internal-state-related gene information and instinctive-behavior-related gene information, and determining whether the expression behavior is to be expressed; a behavior implementation unit for implementing a behavior of the genetic robot; and a controller for recognizing the stimulation through the recognition unit, controlling the behavior determination unit to determine the expression behavior by using one of the internal-state-related gene information and instinctive-behavior-related gene information according to whether the currently-recognized stimulation corresponds to a stimulation included in the instinctive-behavior-related gene information, and, when the expression behavior has been determined, controlling the behavior implementation unit so the genetic robot implements the expression behavior.

In accordance with another aspect of the present invention, there is provided a method for expressing a behavior of a genetic robot in a robot platform for implementing the genetic robot which determines an expression behavior according to genetic information, the method including a stimulation recognition step of recognizing a stimulation generated to the genetic robot; an instinctive behavior judgment step of judging whether there is an instinctive behavior corresponding to the recognized stimulation; a behavior determination step of determining an instinctive behavior corresponding to the recognized stimulation when there is the instinctive behavior corresponding to the recognized stimulation, and determining an expression behavior according to an internal state updated by the recognized stimulation when there is no instinctive behavior corresponding to the recognized stimulation; and a behavior implementation step of allowing the genetic robot to actually implement the determined instinctive behavior or the determined expression behavior.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will now be described with reference to the accompanying drawings. It is to be noted that the same elements are indicated with the same reference numerals throughout the drawings. In the following description, a detailed description of known functions and configurations incorporated herein will be omitted when it may obscure the subject matter of the present invention.

First, for a better understanding of the present invention, the basic concept of the present invention will be briefly described. According to the present invention, when a controller of a robot platform, which drives a robot to express a behavior according to essential-element-related gene information, internal-state-related gene information, behavior-determination-related gene information and instinctive-behavior-related gene information, recognizes a stimulation, the controller determines whether there is a preset instinctive behavior corresponding to the recognized stimulation. When there is a preset instinctive behavior corresponding to the recognized stimulation, the controller determines whether the recognized stimulation corresponds to the first generated stimulation or a repeatedly-generated stimulation, and determines an instinctive behavior to be expressed according to the recognized stimulation and the number of times of repeated stimulations. Then, the controller enables the robot to perform an instinctive behavior corresponding to the currently-recognized stimulation by expressing the determined instinctive behavior. Accordingly, the present invention has an effect of providing a robot which is implemented to be more similar to real life. The robot platform represents a platform for driving a robot. The phrase "instinctive behavior", as used herein, represents behaviors which general life performs in response to stimulations, for example, reflexive behaviors, such as a behavior to close eyes of the life when the life suddenly becomes light, or a behavior to avoid or minimize a danger that may be probably imposed on the life itself.

Figure 1:
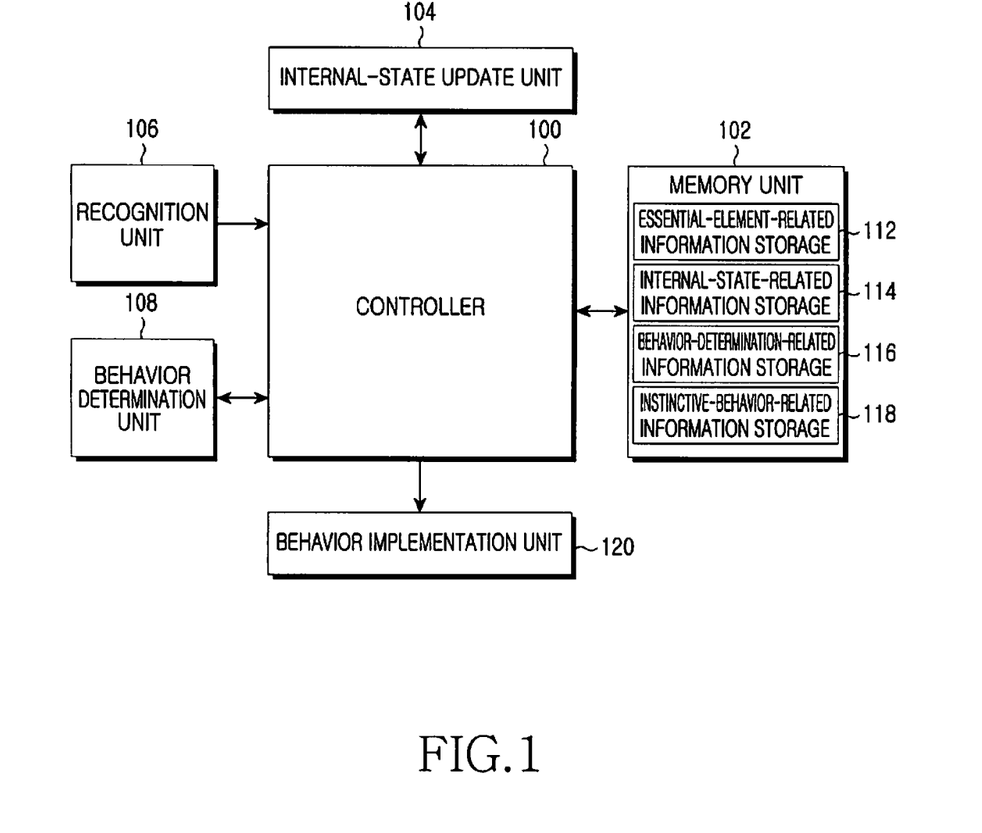
FIG. 1 is a block diagram of a genetic robot platform according to the present invention.

FIG. 1 shows a robot platform according to the present invention.

The robot platform in FIG. 1 includes a controller 100, a memory unit 102, an internal-state update unit 104, a recognition unit 106 and a behavior determination unit 108, which are all interconnected by the controller 100. The controller 100 recognizes a variety of stimulations recognized though the recognition unit 106 according to a preset protocol. Also, the controller 100 determines whether there is an instinctive behavior corresponding to a recognized stimulation, based on pre-stored instinctive-behavior-related gene information. Then, when there is no instinctive behavior corresponding to a currently-recognized stimulation, the controller 100 transfers information about the recognized stimulation to the internal-state update unit 104 to update initially-set parameters according to current internal-state-related gene information. Next, the controller 100 determines a current internal state of the robot according to an updated current internal state. Then, the controller 100 transfers the currently-determined internal state and initially-set behavior-determination-related gene information to the behavior determination unit 108 to determine whether a behavior is to be expressed. When it is determined that a specific expression behavior is to be expressed, the controller 100 controls a behavior implementation unit 120 to implement the determined expression behavior.

Meanwhile, when a stimulation, to which an instinctive behavior has been preset, is recognized, the controller 100 transfers information about an instinctive behavior corresponding to the currently recognized stimulation to the behavior determination unit 108. Then, the behavior determination unit 108 determines whether the instinctive behavior is to be expressed, and returns a result of the determination to the controller 100. Then, the controller 100 controls the behavior implementation unit 120 according to whether the instinctive behavior is to be performed so a determined instinctive behavior can be implemented.

The memory unit 102 connected to the controller 100 may include a Read-Only Memory (ROM), a flash memory, a Random Access Memory (RAM), etc. The memory unit 102 stores programs and various reference data, which are necessary for the processing and controlling operations of the controller 100. Also, the memory unit 102 provides a working memory for the controller 100, and provides an area for storing various updatable data for storage.

In addition, the memory unit 102 includes storage areas for storing the essential-element-related gene information, the internal-state-related gene information and the behavior-determination-related gene information. As described above, the essential-element-related gene information includes parameters of essential elements for specific internal states, changes in each internal state, and external behavior expressions corresponding to internal states. The internal-state-related gene information includes parameters for various external stimulations and the internal states corresponding to the external stimulations. The behavior-determination-related gene information includes parameters for various expression behaviors and the internal states corresponding to the expression behaviors. Accordingly, when recognizing a stimulation, the controller 100 can update the values of the current internal-state-related parameters of the robot according to the internal-state-related gene information and essential-element-related gene information which correspond to the recognized stimulation, and can determine a specific expression behavior according to the currently-updated internal-state-related parameter values. In the following description, a storage area storing the essential-element-related gene information will be designated as an essential-element-related information storage unit 112, a storage area storing the internal-state-related gene information will be designated as an internal-state-related information storage unit 114, and a storage area storing the behavior-determination-related gene information will be designated as a behavior-determination-related information storage unit 116.

In addition, the memory unit 102 stores instinctive-behavior-related gene information relating to specified instinctive behaviors. The phrase "instinctive-behavior-related gene information", as used herein, represents information including parameters for behaviors which can be expressed in response to various external stimulations to be recognizable by the recognition unit 106. In addition, the instinctive-behavior-related gene information may further include information about the number of repeated times so when the same stimulation is repeated, the robot can perform different instinctive behaviors depending on each of repeated stimulations.

For example, when the user applies a "strike" to the robot for the first time, the robot recognizes the stimulation for the first time and may perform a surprised action or a slightly shrinking action. Then, if such a strike is repeated, the robot may repeat the shrinking action and then perform an action to defend against or avoid the strike when the same stimulation is repeated more than a particular number of times. This can be achieved by setting a parameter for a specified expression behavior to have different values depending on the number of repeated times of the same stimulation. Also, such a parameter may be set based on the durations as well as on the number of repeated times. Table 4 shows an example of such instinctive-behavior-related gene information.

TABLE 4

|  |  | Expression behaviors | | | |
|---|---|---|---|---|---|
|  |  | Shrinking | Defending | Avoiding | ... |
| External stimulation | Tickle | 100 | 20 | 50 | ... |
|  | Heat | 200 | 0 | 0 | ... |
|  | Strike | 50 | 150 | 100 | ... |
|  | ... | ... | ... | ... | ... |
| The number of repeated times | Once | 150 | 50 | 50 | ... |
|  | Three times | 100 | 100 | 150 | ... |
|  | Five times | 50 | 150 | 100 | ... |
|  | ... | ... | ... | ... | ... |
| Duration | 5 seconds | 150 | 50 | 50 | ... |
|  | 10 seconds | 100 | 100 | 150 | ... |
|  | 15 seconds | 50 | 150 | 200 | ... |
|  | ... | ... | ... | ... | ... |

For example, when recognizing an external stimulation, the robot determines through the instinctive-behavior-related gene information that the currently-recognized stimulation corresponds to a stimulation to express an instinctive behavior. Then, the robot reads an external stimulation parameter included in the instinctive-behavior-related gene information, and determines an expression behavior corresponding to the currently-recognized stimulation. That is, for example, when the currently-recognized external stimulation is a "strike," it is most probable that a "defending" action is to be expressed, because an expression behavior having the highest parameter for the external stimulation "strike" is the "defending" in the case of the instinctive-behavior-related gene information illustrated in Table 4. However, when only a parameter value for one expression behavior is valid and parameter values for other expression behaviors are "0," only the one expression behavior may be expressed without expression of the other behaviors. For example, when an external stimulation is "heat," only an expression behavior of a "shrinking" can be selected and other expression behaviors cannot be selected. This is because the parameter values for the other expression behaviors are "0." Therefore, when parameters for specified external stimulations have been set as described above, expression behaviors may be represented as reflexive behaviors expressed reflexively in response to each external stimulation.

Meanwhile, as shown in Table 4, when the currently-set instinctive-behavior-related gene information further includes elements for a number of repeated times and elements for durations, the controller 100 senses the number of times of the currently-recognized stimulation. That is, for example, when the currently-recognized stimulation corresponds to a stimulation generated for the first time, an expression behavior for the current stimulation is determined by considering not only the parameter for each expression behavior corresponding to external stimulation "strike," but also the parameters for each expression behavior corresponding to a one-time stimulation. That is, when a stimulation of "strike" is generated once, as described above, "shrinking" parameters have a value of 50 (parameter of an external stimulation) and a value of 150 (parameter of the number of repeated times), and "defending" parameters have a value of 150 (parameter of an external stimulation) and a value of 50 (parameter of the number of repeated times), so the robot expresses any one of the "defending" and "shrinking" expression behaviors at an equal ratio.

The "duration" also may be used in a similar manner. For example, depending on whether the same stimulation applied to the robot by the user is continued for a long period of time or for a short period of time, corresponding parameters may be set to have different values, as shown in Table 4. In addition, depending on the difference between such parameter values, the robot may determine different expression behaviors. In the following description, a storage area storing such instinctive-behavior-related gene information will be designated as an instinctive-behavior-related information storage unit 118.

When a stimulation as described above is generated, the recognition unit 106 recognizes the generated stimulation and outputs information about the currently-recognized stimulation to the controller 100. The stimulation includes all kinds of stimulations applied to a robot implemented in a robot platform. For example, the stimulation may include external stimulations, such as the "strike," applied from the exterior of the robot.

The internal-state update unit 104 updates the currently-set internal-state-related gene information according to a stimulation recognized by the recognition unit 106 under the control of the controller 100. The behavior determination unit 108 determines whether a specified behavior is to be expressed according to the -currently-updated internal-state-related gene information, which is applied from the controller 100, under the control of the controller 100. Then, when expression of a specified behavior has been determined, information about the determined behavior is transferred to the controller 100.

In this case, in order to determine an instinctive behavior in response to a stimulation, the behavior determination unit 108 may judge if there is an instinctive behavior corresponding to the currently-recognized stimulation before determining whether a specified instinctive behavior is to be expressed according to a result of the judgment. Also, when the instinctive-behavior-related gene information further include parameters for the number of repeated times and parameters for durations, these parameters may be reflected in determining whether an instinctive behavior is to be expressed in response to the currently-input stimulation. Then, a result of determination of whether a specified instinctive behavior is to be expressed is transferred to the controller 100.

The behavior implementation unit 120 controls the robot to actually perform an expression behavior, which has been determined by the behavior determination unit 108, under the control of the controller 100. For example, when the currently-determined behavior corresponds to an instinctive behavior, the behavior implementation unit 120 controls the robot to perform the currently-determined instinctive behavior. According to the robot platform of the present invention, the robot can be implemented to perform an instinctive behavior when the currently-recognized stimulation uses the instinctive behavior.

Figure 2:
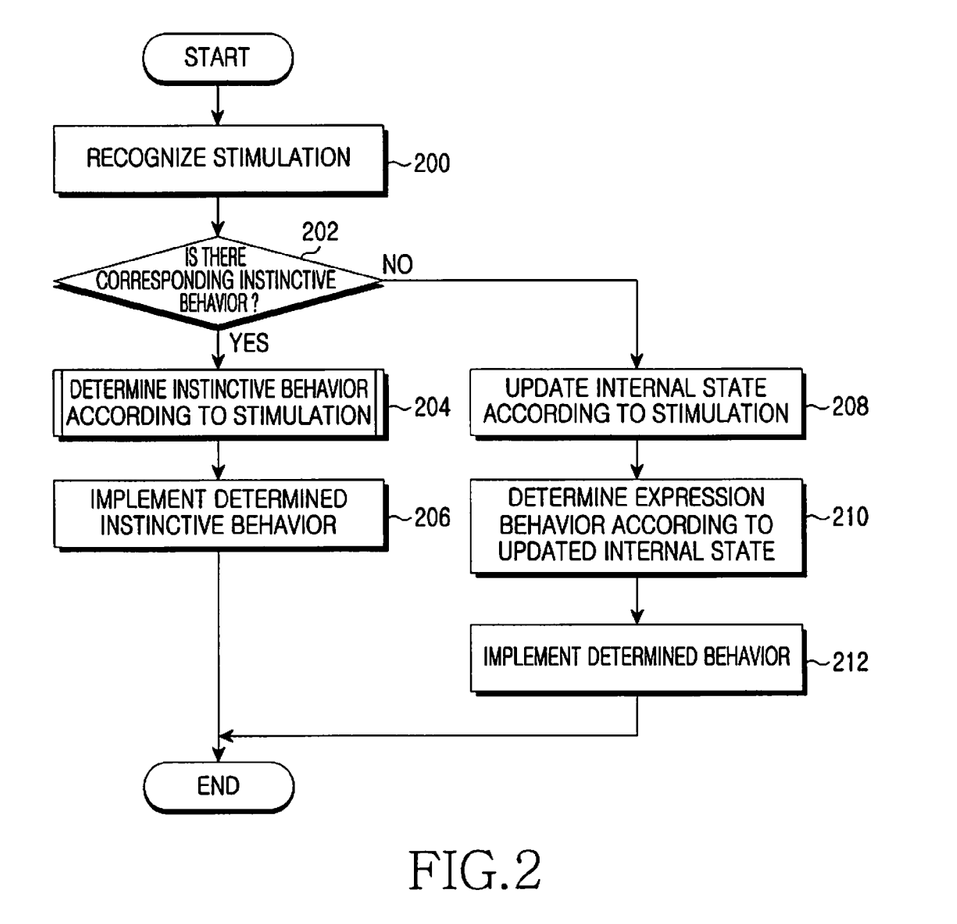
FIG. 2 is a flowchart illustrating the operations for implementing an expression behavior of the genetic robot in the genetic robot platform according to the present invention.

FIG. 2 shows operations for implementing an expression behavior of the robot in the robot platform according to the present invention.

In step 200, the controller 100 of the robot platform according to the present invention recognizes the kind of stimulation which is currently generated and sensed. Then, in step 202, the controller 100 checks if there is an instinctive behavior corresponding to the currently-recognized stimulation. In this case, the controller 100 can recognize whether there is an instinctive behavior corresponding to the stimulation recognized by the recognition unit 106, from the instinctive-behavior-related gene information stored in the instinctive-behavior-related information unit 118.

When it is determined in step 202 that there is an instinctive behavior corresponding to the currently-recognized stimulation, the controller 100 proceeds to step 204, in which the controller 100 determines whether the instinctive behavior is to be expressed in response to the currently-recognized stimulation through the behavior determination unit 108. Then, when it is determined that the instinctive behavior is to be expressed, the controller 100 proceeds to step 206, in which the controller 100 controls the behavior implementation unit 120 to implement the determined instinctive behavior.

The instinctive-behavior-related gene information may include parameters for "durations" and parameters for "the number of repeated times," as described above. In this case, the behavior determination unit 108 may additionally consider the number of repeated times and the duration of the recognized stimulation upon determining whether the instinctive behavior is to be expressed in response to the recognized stimulation. As an example of such a method, a procedure for allowing the behavior determination unit 108 to determine an expression behavior in consideration of the parameters for the number of repeated times will be described later, with reference to FIG. 3.

Meanwhile, when it is determined in step 202 that there is no instinctive behavior corresponding to the stimulation recognized in step 200, the controller 100 proceeds to step 208, in which the controller 100 controls the internal-state update unit 104 to update the parameters of the current internal-state-related gene information according to the currently-recognized stimulation. Then, in step 210, the controller 100 applies the parameters of the currently-updated internal-state-related gene information to the behavior determination unit 108, and controls the behavior determination unit 108 to determine a specific behavior according to the current internal state of the robot and to determine whether the specific behavior is to be expressed. When it is determined that the specific behavior is to be expressed, the controller 100 proceeds to step 212, in which the controller 100 controls the behavior implementation unit 120 to actually implement the determined specific behavior through the robot. As described above, the robot platform according to the present invention determines an expression behavior of the robot to be performed, by means of four kinds of gene information, that is, the essential-element-related gene information, internal-state-related gene information, behavior-determination-related gene information and instinctive-behavior-related gene information. That is, the robot platform according to the present invention judges whether a stimulation currently-applied to the robot corresponds to a stimulation causing an instinctive behavior, and determines whether the instinctive behavior or an expression behavior corresponding to the current internal state is to be expressed according to a result of the judgment. Then, the robot platform controls the determined instinctive behavior or expression behavior to be implemented through the robot, thereby implementing a robot to behave in a manner more similar to real life.

Figure 3:
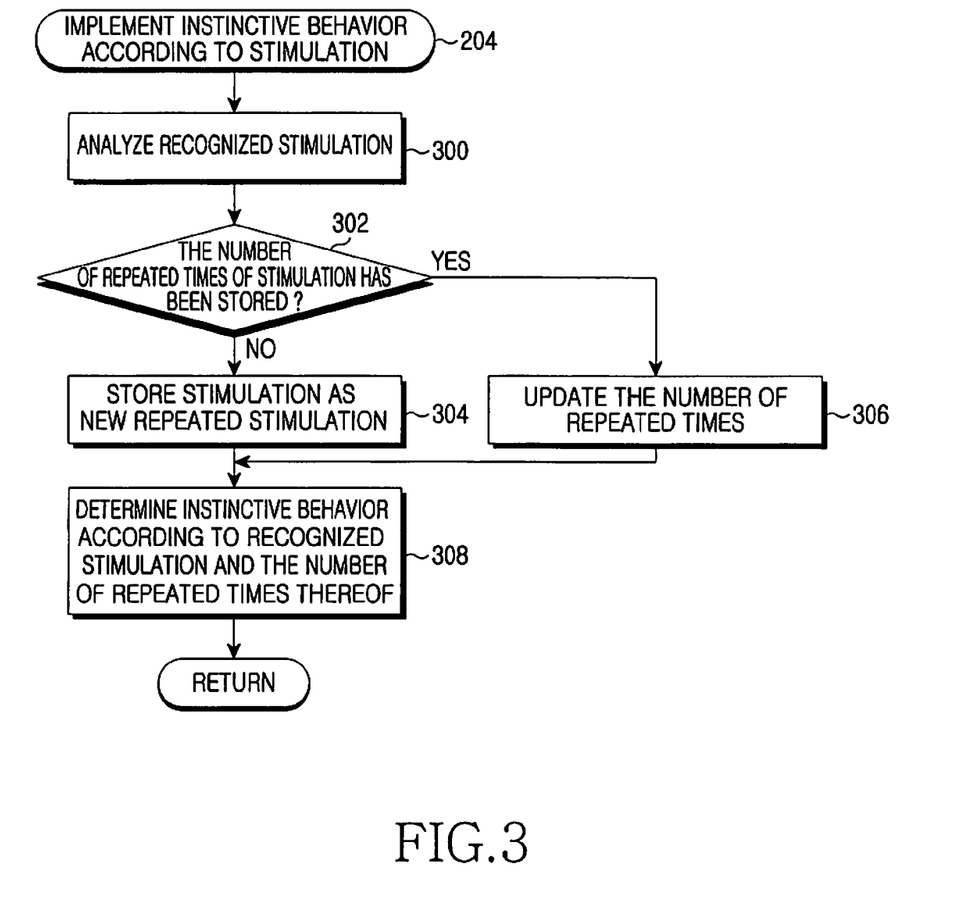
FIG. 3 is a flowchart illustrating the operation for implementing an instinctive behavior in accordance with a recognized stimulation in the genetic robot platform according to the present invention.

FIG. 3 shows an operation of the controller 100 to implement an instinctive behavior through the behavior determination unit 108 according to the currently-recognized stimulation and the number of repeated times of the stimulation in the robot platform according to the present invention.

When the controller 100 according to the present invention determines in step 202 that there is an instinctive behavior corresponding to the currently-recognized stimulation, the controller 100 proceeds to step 300. In step 300, the controller 100 analyzes the currently-recognized stimulation so as to check which instinctive behavior corresponds to the currently-recognized stimulation. Then, the controller 100 proceeds to step 302, in which the controller 100 checks if information about the number of repeated times of the currently-recognized stimulation has been stored. Information about the number of repeated times may be stored in a separate storage area (not shown) of the memory unit 102.

When it is determined in step 302 that information about the number of repeated times of the currently-recognized stimulation has not been stored, the controller 100 proceeds to step 304. In step 304, the controller 100 recognizes the currently-recognized stimulation as a new stimulation, and stores "1" as the number of repeated times of the currently-recognized stimulation. Then, the controller 100 proceeds to step 308, in which the controller 100 determines an instinctive behavior according to the currently-recognized stimulation and the number of repeated times of the stimulation. In this case, since the number of repeated times stored currently is "1," the controller 100 determines an instinctive behavior to be expressed and determines whether the instinctive behavior is to be expressed, by using parameter values corresponding to the number of repeated times of "1" among the parameters for the instinctive-behavior-related gene information and parameter values for the instinctive behavior corresponding to the currently-recognized stimulation. Whether the instinctive behavior is to be expressed may be determined by various methods. For example, it may be determined that the instinctive behavior is to be expressed when a value determined by the parameter values (e.g., a value determined by operation of a function with a parameter value according to a number of repeated times and a parameter value of an expression behavior corresponding to an external stimulation) is equal to or greater than a preset value. Otherwise, whether the instinctive behavior is to be expressed may be determined by conditions. For example, the instinctive behavior my be expressed based on a condition that a number of repeated times is equal to or greater than "n," a condition that a parameter for a specified internal state has a value equal to or greater than a preset value, or the like.

However, if it is determined in step 302 that information about a number of repeated times of the currently-recognized stimulation has been stored, the controller 100 proceeds to step 306, in which the controller 100 updates the information about the number of repeated times which has been stored. That is, when the information about the number of repeated times has been stored, the information about the number of repeated times of the currently-recognized stimulation is updated to a value increased by "1" in order to include the currently-recognized stimulation.

Then, the controller 100 proceeds to step 308, in which the controller 100 determines an instinctive behavior according to the currently-recognized stimulation and the number of repeated times. In this case, the controller 100 determines an instinctive behavior to be expressed and whether the instinctive behavior is to be expressed, by using parameter values according to the number of repeated times updated currently and parameter values of the instinctive behavior corresponding to the currently-recognized stimulation from among parameters for the instinctive-behavior-related gene information. According to the present invention, when the user consecutively applies the same stimulation to the robot, the robot can perform various instinctive behaviors according to the number of repeated times of the stimulation.

While the present invention has been shown and described with reference to certain preferred embodiments thereof, it will be understood by those skilled in the art that various changes in form and details may be made therein without departing from the spirit and scope of the invention as defined by the appended claims. Particularly, although the preferred embodiments of the present invention have been described about a case where the instinctive-behavior-related gene information includes only external stimulations in Table. 4, the instinctive-behavior-related gene information according to the present invention may include all stimulations generated in the robot as well as the external stimulations, as described above. That is, according to another example of the present invention, more various conditions may be further included for instinctive behaviors. For example, when the robot sleeps, and then awakens from the sleep, the robot may perform a reflexive behavior, such as a stretching action, by sensing the awakening from the sleep as a stimulation. In other words, when the robot awakens from sleep, the controller 100 of the robot platform senses the robot, and searches the instinctive-behavior-related gene information for an instinctive behavior corresponding to the awakening from the sleep. Then, the controller 100 controls the robot to express a stretching action, which is an instinctive behavior obtained as a result of the searching. In addition, the robot may perform an instinctive behavior according to a change in the internal state of the robot. For example, when the internal state of the robot includes a hungry state, the recognition unit 106 of the robot platform may recognize the hungry state as an internal stimulation. In this case, the controller 100 may control the robot to express a stomach growling sound, which is an instinctive behavior corresponding to the internal stimulation recognized by the recognition unit 106. Instinctive behaviors and corresponding conditions according to preferred embodiments of the present invention may be implemented as shown in Table 5 below.

TABLE 5

| CONDITION | INSTINCTIVE BEHAVIOR CORRESPONDING TO EACH CONDITION |
|---|---|
| Timing sensing condition | Shrinking in response to sudden appearance |
| | Shrinking in response to sudden loud sound |
| | Looking about in response to sudden disappearance |
| | Looking about when environment becomes noisy |
| | Watching around when environment suddenly becomes dark |
| | Closing eyes when environment suddenly becomes light |
| | Stretching when getting up |
| | Lowering head when being scolded |
| Internal state condition | Expression of a hungry state (a stomach growling sound) when very hungry |
| | Dozing when feeling very sleepy |

TABLE 5-continued

| CONDITION | INSTINCTIVE BEHAVIOR CORRESPONDING TO EACH CONDITION |
|---|---|
| Instinctive behavior according to timing sensing condition and internal state condition | Being glad when being hugged at a happy time<br>Being glad when being hugged at an alone time<br>Prostrating itself when being hugged at a fearful time<br>Resisting when being fearful<br>Shouting when being hugged at an angry time<br>Being cheerful when being fondled at a happy time<br>Shaking its hair when being angry<br>Ignoring voice when being unpleasant |
| Instinctive behavior according to repetition condition | Being afraid when appearance and disappearance are repeated |
| Expression according to timing sensing condition and internal state condition | Asking to be shaken once more when being shaken and put down at a happy time<br>Asking to be fondled once more when being fondled and put down at a happy time<br>Being dizzy when being shaken and put down |

In addition, although the present invention has been described about a case where the number of repeated times is considered in addition to the external stimulations, when there are parameters for durations as shown in Table 4, the controller 100 may judge the duration of the stimulation, and additionally take a parameter for the duration into consideration to determine an instinctive behavior of the robot and whether the instinctive behavior is to be expressed. In this case, the robot platform according to the present invention can implement the robot which performs different instinctive behaviors depending on durations of a stimulation although the stimulation is repeated the same number of times.

In addition, although the present invention have been described about a case where information about a number of repeated times is updated only based on repetition of a stimulation, information about the number of repeated times may be updated as time elapses. For example, information about the number of repeated times may be set to reduce the number of repeated times by a preset value as a time period has elapsed. In this case, the robot implemented in the robot platform according to the present invention decreases the number of repeated times of a stimulation as time elapses, which actually gives the same effect as gradually losing a memory of the repeated stimulation in real life as time elapses. Accordingly, the scope of the invention is not to be limited by the above embodiments but by the claims and the equivalents thereof.

As described above, according to the preferred embodiments of the present invention, the robot implemented in the robot platform analyzes a recognized stimulation to determine if the stimulation corresponds to a stimulation causing an instinctive behavior, and selectively performs the instinctive behavior according to a result of the determination, so it is possible to implement a robot which is more similar to real life.

What is claimed is:

1. A robot platform for driving a genetic robot which determines an expression behavior according to genetic information, the robot platform comprising:
a recognition unit for recognizing a stimulation generated to the genetic robot;
a memory unit for storing internal-state-related gene information including a parameter for at least one internal state of the genetic robot, and instinctive-behavior-related gene information including a parameter of at least one specific behavior defined as an instinctive behavior for at least one stimulation;
a behavior determination unit for determining an expression behavior to be expressed by the genetic robot according to one of the internal-state-related gene information and instinctive-behavior-related gene information, and determining whether the expression behavior is to be expressed;
a behavior implementation unit for implementing a behavior of the genetic robot; and
a hardware controller for recognizing the stimulation through the recognition unit, controlling the behavior determination unit to determine the expression behavior by using one of the internal-state-related gene information and instinctive-behavior-related gene information according to whether the recognized stimulation corresponds to a stimulation included in the instinctive-behavior-related gene information, and controlling the behavior implementation unit so the genetic robot implements the expression behavior when the expression behavior has been determined,
wherein, when the recognized stimulation corresponds to the stimulation included in the instinctive-behavior-related gene information, the expression behavior is determined based on at least one of a number of repeated times the recognized stimulation has occurred and a duration of the recognized stimulation.

2. The robot platform as claimed in claim 1, wherein when the recognized stimulation corresponds to a stimulation included in the instinctive-behavior-related gene information, the hardware controller determines one of instinctive behaviors to the recognized stimulation to be expressed by means of parameters of the instinctive behaviors, and controls the behavior implementation unit to determine whether the determined instinctive behavior is to be expressed.

3. The robot platform as claimed in claim 2, wherein the instinctive-behavior-related gene information further comprises parameters for a number of repeated times, which includes parameters for the number of repeated times of at least one stimulation and for at least one instinctive behavior included in the instinctive-behavior-related gene information.

4. The robot platform as claimed in claim 3, wherein when the recognized stimulation corresponds to the stimulation included in the instinctive-behavior-related gene information, the hardware controller checks whether the recognized stimulation corresponds to a repeatedly recognized stimulation.

5. The robot platform as claimed in claim 4, wherein when the recognized stimulation corresponds to a repeatedly recognized stimulation, the hardware controller determines one of the instinctive behaviors to be expressed by using the parameters for the number of repeated times corresponding to the number of repeated times of the recognized stimulation and using parameters of instinctive behaviors for the recognized stimulation, and then controls the behavior implementation unit to determine whether the determined instinctive behavior is to be expressed.

6. The robot platform as claimed in claim 2, wherein the instinctive-behavior-related gene information further comprises duration parameters, which are parameters for a duration of at least one stimulation and for at least one instinctive behavior included in the instinctive-behavior-related gene information.

7. The robot platform as claimed in claim 6, wherein when the recognized stimulation corresponds to the stimulation included in the instinctive-behavior-related gene information, the hardware controller checks whether the recognized stimulation corresponds to a stimulation continued for a time period.

8. The robot platform as claimed in claim 7, wherein when the recognized stimulation corresponds to the stimulation continued for a time period, the hardware controller determines one of the instinctive behaviors to be expressed by using duration parameters corresponding to the duration of the recognized stimulation and using parameters of instinctive behaviors for the recognized stimulation, and then controls the behavior implementation unit to determine whether the determined instinctive behavior is to be expressed.

9. The robot platform as claimed in claim 3, wherein the instinctive-behavior-related gene information further comprises duration parameters, which are parameters for a duration of at least one stimulation and for at least one instinctive behavior included in the instinctive-behavior-related gene information.

10. The robot platform as claimed in claim 9, wherein when the recognized stimulation corresponds to a repeatedly recognized stimulation, the hardware controller determines one of the instinctive behaviors to be expressed by using the parameters for the number of repeated times corresponding to the number of repeated times of the recognized stimulation, duration parameters corresponding to the duration of the recognized stimulation, and parameters of instinctive behaviors for the recognized stimulation, and then controls the behavior implementation unit to determine whether the determined instinctive behavior is to be expressed.

11. A method for expressing a behavior of a genetic robot in a robot platform for implementing the genetic robot which determines an expression behavior according to genetic information by a hardware controller, the method comprising:
  a stimulation recognition step of recognizing a stimulation generated to the genetic robot;
  an instinctive behavior judgment step of judging whether there is an instinctive behavior corresponding to the recognized stimulation;
  a behavior determination step of determining an instinctive behavior corresponding to the recognized stimulation based on at least one of a number of repeated times the recognized stimulation has occurred and a duration of the recognized stimulation when there is the instinctive behavior corresponding to the recognized stimulation, and determining an expression behavior according to an internal state updated by the recognized stimulation when there is no instinctive behavior corresponding to the recognized stimulation; and
  a behavior implementation step of allowing the genetic robot to actually implement the determined instinctive behavior or the determined expression behavior.

12. The method as claimed in claim 11, wherein in the instinctive behavior judgment step, it is determined whether there is an instinctive behavior corresponding to the recognized stimulation according to whether the recognized stimulation is included in instinctive-behavior-related gene information comprising a parameter of at least one specific behavior defined as an instinctive behavior for at least one stimulation.

13. The method as claimed in claim 11, wherein in the behavior determination step, when the instinctive behavior is determined, one of instinctive behaviors is determined to be expressed by using parameters of the instinctive behaviors for the recognized stimulation.

14. The method as claimed in claim 11, wherein the behavior determination step comprises, when the instinctive behavior is determined, the steps of:
  judging whether the recognized stimulation corresponds to a repeated stimulation;
  determining the number of repeated times of the recognized stimulation when the recognized stimulation corresponds to a repeated stimulation; and
  determining an instinctive behavior to be expressed according to the number of repeated times of the recognized stimulation, by using parameters of instinctive behaviors for the recognized stimulation and using parameters for the instinctive behaviors and a number of repeated times of at least one stimulation.

15. The method as claimed in claim 14, wherein, in the behavior determination step, the number of repeated times of the stimulation decreases as time elapses.

16. The method as claimed in claim 11, wherein the behavior determination step comprises, when the instinctive behavior is determined, the steps of:
  sensing the duration of the recognized stimulation; and
  determining an instinctive behavior to be expressed according to the duration of the recognized stimulation by using parameters of instinctive behaviors for the recognized stimulation and using parameters for the instinctive behaviors and a duration of at least one stimulation.

17. The method as claimed in claim 11, wherein the behavior determination step comprises, when an expression behavior according to an internal state is determined, the steps of:
  updating a parameter for each internal state of the robot according to the recognized stimulation; and
  determining the expression behavior according to the updated internal state information.

* * * * *